(12) United States Patent
Bai et al.

(10) Patent No.: US 11,873,444 B1
(45) Date of Patent: Jan. 16, 2024

(54) NANOGRAPHENE AND PREPARATION METHOD AND USE THEREOF AND OIL-BASED DRILLING FLUID

(71) Applicant: Southwest Petroleum University, Chengdu (CN)

(72) Inventors: Yang Bai, Chengdu (CN); Daoxiong Li, Chengdu (CN); Ren Wang, Beijing (CN); Gang Xie, Chengdu (CN); Danchao Huang, Chengdu (CN); Wenzhe Li, Sichuan (CN); Feng Dai, Sichuan (CN); Jintang Wang, Chengdu (CN); Jing Zhang, Chengdu (CN); Jinsheng Sun, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/175,072

(22) Filed: Feb. 27, 2023

(30) Foreign Application Priority Data

Aug. 2, 2022 (CN) .......................... 202210920684.1

(51) Int. Cl.
| | |
|---|---|
| *C09K 8/34* | (2006.01) |
| *C01B 32/23* | (2017.01) |
| *C01B 32/19* | (2017.01) |
| *C01B 32/225* | (2017.01) |

(52) U.S. Cl.
CPC ................ *C09K 8/34* (2013.01); *C01B 32/19* (2017.08); *C01B 32/225* (2017.08); *C01B 32/23* (2017.08); *C01P 2004/62* (2013.01); *C09K 2208/10* (2013.01)

(58) Field of Classification Search
CPC ...... C09K 8/34; C09K 2208/10; C01B 32/19; C01B 32/225; C01B 32/23; C01P 2004/62
See application file for complete search history.

(56) References Cited

U.S. PATENT DOCUMENTS

2017/0369323 A1* 12/2017 Kowal .................. C01B 32/198

FOREIGN PATENT DOCUMENTS

| CN | 104789188 A | | 7/2015 |
|---|---|---|---|
| CN | 107628613 A | | 1/2018 |
| CN | 112723351 | * | 4/2021 |
| CN | 112723351 A | | 4/2021 |
| CN | 113088268 A | | 7/2021 |
| CN | 114408910 A | | 4/2022 |
| CN | 114605974 A | | 6/2022 |
| CN | 114752064 A | | 7/2022 |

OTHER PUBLICATIONS

Zhang (Z. Zhang et al., Gas-driven exfoliation for producing high-quality graphene, Chem. Commun., 2019, 55, 7749-7751).*
Feng Pan et al., "Preparation of graphene and its application as carrier", New Chemical Materials, 2018, vol. 46, No. 10 (6 pages total).
Chaogang Bing, "Synthesis and Characterization of Graphene Oxides and Their Composites", Dalian University of Technology, Masteral Dissertation, 2014 (55 pages total).
Norasazly Mohd Taha et al., "Nano Graphene Application Improving Drilling Fluids Performance", International Petroleum Technology Conference, 2015, IPTC-18539-MS, pp. 1-16 (16 pages total).

* cited by examiner

*Primary Examiner* — Kumar R Bhushan
(74) *Attorney, Agent, or Firm* — Sughrue Mion, PLLC

(57) ABSTRACT

A nanographene, a preparation method thereof, and uses thereof are disclosed. The method of preparing the nanographene includes the steps: (1) carrying out a first reaction by contacting a raw material graphite and a first oxidizing agent with an intercalating agent to obtain a modified graphite; (2) performing a second reaction by contacting the modified graphite and an acid with a second oxidizing agent to obtain a graphene pre-product; and (3) subjecting the graphene pre-product to an air-flow exfoliation to prepare a nanographene. An oil-based drilling fluid containing the nanographene produced by the method is also disclosed.

12 Claims, No Drawings

NANOGRAPHENE AND PREPARATION METHOD AND USE THEREOF AND OIL-BASED DRILLING FLUID

FIELD

The present disclosure relates to the technical field of oil field chemistry, and particularly to a nanographene, a preparation method and a use thereof, and an oil-based drilling fluid.

BACKGROUND

The borehole wall instability is a major unsolved engineering challenge which has troubled the industrial participants of drilling fluid for many years and shall be urgently solved. The instable borehole wall may cause downhole troublesome conditions such as borehole collapse, sticking of a drilling tool, and lost circulation, thereby significantly affect the drilling quality and progress. The borehole wall instability mainly occurs in shale stratums containing fractures, the shale stratums mostly present stratifications and micro-fractures which are close or open and have strong capillary force, and the drilling fluid can easily invade under the positive pressure differential and capillary pressure, it results in the fracturing of the mud shale along the fracture plane or stratification surface, and longitudinal and horizontal development in the fracture plane continuously, thereby magnifying the borehole wall instability. In response to the borehole wall instability in such stratum, a plugging material may be added into the drilling fluid so as to fill the fracture and form a barrier layer on the wellbore wall, it can restrain pressure transmission caused by invasion of wellbore fluids into the stratum, thereby fulfill the purpose of stabilizing the wellbore wall. The oil-based drilling fluids offer advantages over the water-based fluids in high temperature resistance, salt intrusion resistance, facilitating wall stability and reduced damage to the oil and gas reservoir.

The conventional plugging materials used in drilling fluids generally have a particle size within a range of 0.1-100 μm, and are mainly used for plugging pore throats and fractures having a size range of 0.1-1 mm in the stratum, while the smallest size micro-fractures in the stratum rock have a size distribution of 1-100 μm, thus the conventional plugging materials can hardly form a mud cake in the low permeability stratum and perform the plugging function. Therefore, with respect to the final stage of plugging materials for maintaining the borehole wall stability in the stratum with micro-fractures, their particle size must be in the nanometer scale in order to effectively prevent the drilling fluid from invading the stratum and play a role of stabilizing the borehole wall.

However, although the existing nanometer plugging materials have the nano-scale particle size, the plugging materials cannot be dispersed in the liquid phase at the nano-scale because the nanometer materials have the characteristics of small particle size, large specific surface energy and being prone to agglomerate, thus the plugging materials can hardly block the nano-scale micro-fractures and pores; in addition, the nanometer materials blocking the pores and fractures have poor pressure-bearing capacity, cannot block pressure transmission, such that the materials cannot produce the desirable plugging effect.

As a result, the provision of a nano-sized plugging material having excellent lipophilicity and high pressure bearing capacity has important significance for meeting the requirements of the oil and gas exploitation and operation in the stratum rock having a nano-scale pore size.

SUMMARY

The present disclosure aims to overcome the problems in the prior art that the plugging materials conventionally used in the oil-based drilling fluids are prone to agglomerate, have poor pressure bearing capability and undesired plugging effect, and provide a nanographene, a preparation method and an use thereof, and an oil-based drilling fluid.

In order to achieve the above-mentioned objects, a first aspect of the present disclosure provides a method of preparing nanographene comprising the following steps:
(1) carrying out a first reaction by contacting a raw material graphite and a first oxidizing agent with an intercalating agent to obtain a modified graphite;
(2) performing a second reaction by contacting the modified graphite and an acid with a second oxidizing agent to obtain a graphene pre-product;
(3) subjecting the graphene pre-product to an air-flow exfoliation to prepare a nanographene.

A second aspect of the present disclosure provides a nanographene produced with the method according to the first aspect.

A third aspect of the present disclosure provides a use of the nanographene according to the second aspect as a plugging agent in an oil-based drilling fluid.

A fourth aspect of the present disclosure provides an oil-based drilling fluid comprising the nanographene according to the second aspect.

Due to the above technical scheme, the present disclosure can achieve the following favorable effects:
(1) The nanographene prepared with the method provided by the present disclosure has an average particle diameter of 110-750 nm, excellent lipophilicity, exhibits desirable dispersion effect and does not prone to agglomerate in the oil-based drilling fluids, and has high pressure bearing capacity, thus the nanographene can effectively plug micro/nano-scale pores and fractures in the stratum at a lower concentration, delay pressure transmission, and improve pressure bearing capability of the stratum.
(2) The oil-based drilling fluids provided by the present disclosure comprise the nanographene, the oil-based drilling fluids have a desirable rheological property, high plugging efficiency and strong adaptability, can greatly improve borehole wall stability, and facilitate the reservoir protection.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The specific embodiments of the present disclosure are described in detail below. It should be comprehended that the specific embodiments described herein merely serve to illustrate and explain the present disclosure, instead of imposing a limitation thereto.

A first aspect of the present disclosure provides a method of preparing nanographene comprising the following steps:

(1) carrying out a first reaction by contacting a raw material graphite and a first oxidizing agent with an intercalating agent to obtain a modified graphite;
(2) performing a second reaction by contacting the modified graphite and an acid with a second oxidizing agent to obtain a graphene pre-product;
(3) subjecting the graphene pre-product to an air-flow exfoliation to prepare a nanographene.

According to the present disclosure, the raw material graphite, a first oxidizing agent and an intercalating agent are contacted in step (1) to carry out a first reaction, the first oxidizing agent activates the raw material graphite through oxidation, in the meanwhile, the intercalating agent enters the carbon interlayers of graphite, increasing the interlayer spacing of graphite to produce an activated fluffy graphite, i.e., the modified graphite.

According to the present disclosure, the raw material graphite is preferably natural flake graphite, it is preferable that the natural flake graphite has a particle size within a range of 200-400 mesh and a purity more than 99%.

According to the present disclosure, the first oxidizing agent is preferably at least one selected from the group consisting of ammonium persulfate, potassium persulfate, sodium percarbonate and peroxyacetic acid, more preferably ammonium persulfate.

According to the present disclosure, the intercalating agent is preferably at least one selected from the group consisting of concentrated sulfuric acid, potassium permanganate and periodic acid, further preferably concentrated sulfuric acid.

In the present disclosure, the concentrated sulfuric acid refers to an aqueous solution of sulfuric acid having a concentration not less than 75 wt %.

According to the present disclosure, in order to obtain better oxidative activation and intercalation effects of raw material graphite in the step (1), it is preferable that a weight ratio of raw material graphite:first oxidizing agent:intercalating agent in step (1) is 1:(110-150):(20-60), further preferably 1:(120-140):(30-50).

According to the present disclosure, the first reaction in step (1) is carried out under a temperature condition of 10-25° C. The reaction system consisting of the raw material graphite, the first oxidizing agent and the intercalating agent undergo oxidative activation of the graphite and allow the intercalating agent to enter the graphite interlayer at the temperature required for the first reaction, during which the first oxidizing agent and the intercalating agent will react and continuously release a large amount of gas, until the reaction system no longer has an observable release of gas, which can be considered as an end of the first reaction.

According to the present disclosure, the operation process of the first reaction in step (1) comprises: mixing the raw material graphite, the first oxidizing agent and the intercalating agent according to the aforesaid weight ratio under a normal temperature so as to obtain a homogeneous mixture, the mixing time is preferably 6-10 s, the temperature is then adjusted to the temperature required for the reaction and the stirring is continuously performed to carry out the reaction, it can be observed that a large amount of gas continuously escapes from the reaction system until an end of the first reaction when the gas overflow is completely invisible.

According to the present disclosure, after completion of the first reaction in step (1), a first product system comprising the modified graphite is obtained, a first post-treatment is subsequently performed to remove impurities (including the first oxidizing agent and the intercalating agent which do not fully participate reaction during the first reaction process and are residual, and the soluble by-products generated in the reaction), thereby obtaining the modified graphite.

In the present disclosure, the first post-treatment comprises a water washing and a first ultrasonic treatment executed sequentially. Specifically, repeatedly washing the first product system containing the modified graphite with deionized water and filtrating the first product system until a pH of the filtrate reaches 7, drying the solid phase obtained after the washing process, then placing the solid phase in an organic solvent to subject to a first ultrasonic treatment, subsequently carrying out a solid-liquid separation and drying the solid phase, so as to obtain the modified graphite.

In the present disclosure, the first ultrasonic treatment can promote a desirable dispersion of the solid phase obtained after the water washing process in an organic solvent. Preferably, the organic solvent used in the first ultrasonic treatment may be ethanol, diethyl ether or acetone, preferably ethanol; the conditions of the first ultrasonic treatment comprise a power of 100-500 w, a frequency of 80-100 Hz, a temperature of 20-30° C. and a time of 30-60 min.

In the present disclosure, the normal temperature refers to 20-25° C.

According to the present disclosure, the modified graphite in step (2) is further oxidized and exfoliated by the action of the acid and the second oxidizing agent, so as to obtain a graphene pre-product.

According to the present disclosure, the acid in the step (2) is preferably selected from the group consisting of concentrated sulfuric acid, perchloric acid, periodic acid and concentrated nitric acid, further preferably concentrated sulfuric acid.

In the present disclosure, the concentrated nitric acid refers to an aqueous solution of nitric acid having a concentration not less than 68 wt %.

Preferably, the second oxidizing agent is at least one selected from the group consisting of potassium permanganate, ferric acid, peroxydisulfuric acid and dichromic acid, further preferably potassium permanganate.

According to the present disclosure, in order to obtain a better exfoliation effect, it is preferable in the step (2) that a weight ratio of the modified graphite:acid:second oxidizing agent in step (2) is 1:(20-40):(3-8), further preferably 1:(30-37):(4-6).

According to the present disclosure, the conditions of second reaction in step (2) comprise a temperature of 1-10° C. and a time of 2-4 hours.

According to the present disclosure, the operation process of the second reaction in step (2) comprises: adding the modified graphite to the acid treated by cooling to obtain a mixture, followed by adding the second oxidizing agent, and adjusting the temperature to the temperature required for a reaction to carry out the reaction until completion of the reaction.

According to a preferred embodiment of the present disclosure, it is preferable in step (2) that the acid is cooled to below 4° C., the modified graphite is slowly added while stirring for 1-2 h to obtain a mixture, the second oxidizing agent is subsequently added slowly, and the addition operation is controlled to be within 0.5-1 h, followed by adjusting the temperature to 1-10° C. to carry out reaction for 2-4 h.

According to the present disclosure, after the second reaction in step (2) is completed, a second product system comprising a graphene pre-product is obtained, and subsequently a second post-treatment is performed to remove impurities (including the acid and the second oxidizing agents which do not completely participate reaction during the second reaction process and are residual, the soluble by-products generated in the reaction, and an intermediate product oxide graphite flake which is not completely reacted) to obtain the graphene pre-product.

In the present disclosure, the second post-treatment comprises water washing, acid washing, second ultrasonic treatment and separation treatment which are performed sequentially. Specifically, the second product system comprising the graphene pre-product is mixed with deionized water, heated to 80-90° C. and maintained the temperature for 20-40 min, the water soluble by-products therein are dissolved and washed off, the solid phase obtained by water washing is then subjected to an acid washing, and after the acid washing process, the solid phase is further subjected to water washing with deionized water until a pH of the filtrate reaches 7; the solid phase obtained by washing is mixed with water to obtain a mixed solution, and the mixed solution is subjected to the second ultrasonic treatment; after the second ultrasonic treatment is finished, the mixed solution is standing still for separation, such that a lower solid phase and an upper dispersed phase are obtained, wherein the lower solid phase is an intermediate product oxide graphite flake which is not completely reacted or has a large size, the upper dispersed phase is a viscous dispersion consisting of the graphene pre-product and water, the upper dispersed phase is subjected to drying treatment to obtain the graphene pre-product.

According to the present disclosure, the acid washing in step (2) is performed by using hydrochloric acid, chromic acid or oxalic acid, preferably hydrochloric acid, with a concentration of 10-20 wt %.

According to the present disclosure, the second ultrasonic treatment can promote a more uniform dispersion of the graphene pre-product. Preferably, the conditions of the second ultrasonic treatment comprises: a power of 1,200-2,000 w, a frequency of 200-300 Hz, a temperature of 20-30° C. and a time of 60-100 min.

According to the present disclosure, it is preferable in step (3) that the graphene pre-product is subjected to a crushing treatment before the air-flow exfoliation.

According to the present disclosure, the air-flow exfoliation in step (3) may be performed with the conventional method and apparatus for air-flow exfoliation, which is not particularly limited in the present disclosure. Preferably, the air-flow exfoliation conditions comprise a temperature of 30-90° C.

A second aspect of the present disclosure provides nanographene produced with the method according to the first aspect, wherein the nanographene has an average particle size of 110-750 nm, preferably 110-600 nm, the particle size can satisfy the requirement for plugging the microfactures having a size of 1-10 μm in the stratum.

According to the present disclosure, the nanographene has strong lipophilicity, can be desirably dispersed in the oil phase, it is not prone to agglomerate in an oil-based drilling fluid system, thus the dispersion effect is desirable, and can produce excellent plugging effect at a lower concentration, thereby reducing the stratum permeability and preventing invasion of the drilling fluid.

According to the present disclosure, the nanographene has a strong pressure bearing capability, and can delay pressure transmission of pores and fractures in the stratum, and improve pressure bearing capability of the stratum.

According to the present disclosure, the nanographene has less influence on viscosity and shearing force of oil-based drilling fluid, it exhibits desirable compatibility and strong adaptability.

A third aspect of the present disclosure provides an use of the nanographene according to the second aspect as a plugging agent in an oil-based drilling fluid.

A fourth aspect of the present disclosure provides an oil-based drilling fluid comprising the nanographene according to the second aspect.

According to the present disclosure, the oil-based drilling fluid comprises the following ingredients: 100 parts by weight of a base oil, 5-12 parts by weight of an organic clay, 1-6 parts by weight of an emulsifier, 2-6 parts by weight of a wetting agent, 3-18 parts by weight of the nanographene, 5-30 parts by weight of a weighting agent, 2-10 parts by weight of a filtrate reducer, 10-40 parts by weight of a calcium chloride aqueous solution and 2-7 parts by weight of calcium oxide.

According to the present disclosure, given that the oil-based drilling fluid satisfies the aforementioned composition, it is preferable that the oil-based drilling fluid comprises the following ingredients: 100 parts by weight of a base oil, 6-10 parts by weight of an organic clay, 2-5 parts by weight of an emulsifier, 3-5 parts by weight of a wetting agent, 4-16 parts by weight of the nanographene, 10-20 parts by weight of a weighting agent, 3-6 parts by weight of a filtrate reducer, 20-30 parts by weight of a calcium chloride aqueous solution and 3-6 parts by weight of calcium oxide.

According to the present disclosure, the base oil may be the conventional base oil used in the oil-based drilling fluids in the technical field, the present disclosure has a broadly defined scope of the base oil. The base oil is preferably white oil and/or diesel oil, further preferably white oil, more preferably 3 #white oil and/or 5 #white oil. In the present disclosure, both the white oil and the diesel oil may be conventional and commercially available brand products, the present disclosure does not impose specific limitation thereto.

According to the present disclosure, the organic clay is an oleophilic clay produced from an interaction of a hydrophilic bentonite with an alkyl quaternary ammonium salt cationic surfactant, wherein the hydrophilic bentonite is preferably sodium bentonite; the long chain alkyl group in the alkyl quaternary ammonium salt cationic surfactant preferably contains 12-30 carbon atoms, further preferably 18-25 carbon atoms, more preferably 20-22 carbon atoms. In the present disclosure, the organic clay may be voluntarily produced with a conventional method in the art, or may be a conventional and commercially available brand product, which is not specifically defined in the present disclosure.

According to the present disclosure, the emulsifier comprises a primary emulsifier and a secondary emulsifier; wherein the primary emulsifier is preferably at least one selected from the group consisting of calcium naphthenate, oleic acid and naphthenic acid amides, further preferably oleic acid; and the secondary emulsifier is preferably selected from a Span series emulsifier and/or calcium alkylbenzenesulfonate, further preferably a Span series emulsifier.

In the present disclosure, a formula of the calcium naphthenate preferably has 10-14 carbon atoms, further preferably 11-13 carbon atoms; a formula of the naphthenic acid amide preferably has 12-18 carbon atoms, further preferably 14-16 carbon atoms; a formula of the calcium alkylbenzenesulfonate preferably has 12-18 carbon atoms, further preferably 14-16 carbon atoms; the Span series emulsifier is preferably at least one selected from the group consisting of Span 80, Span 70 and Span and further preferably Span 80. In the present disclosure, the emulsifier may be a conventional and commercially available brand product, the present disclosure is not particularly limited thereto.

According to the present disclosure, the wetting agent may be the wetting agent used for preparing oil-based drilling fluids which is well known among those skilled in the art, the present disclosure imposes a broadly defined scope thereto, the wetting agent is preferably a fatty acid derivative. In the present disclosure, the wetting agent may be a conventional and commercially available brand product, the present disclosure is not particularly limited thereto.

According to the present disclosure, it is preferable that the calcium chloride aqueous solution has a concentration of 20-25 wt %.

According to the present disclosure, the filtrate reducer may be the conventional filtrate reducer used for preparing oil-based drilling fluids in the technical field, the present disclosure imposes a broadly defined scope thereto. The filtrate reducer is preferably at least one selected from the group consisting of sodium carboxymethyl cellulose, humic acid and lignite lye, further preferably sodium carboxymethyl cellulose. In the present disclosure, the filtrate reducer may be voluntarily prepared with a method conventionally used in the art, or may be a conventional and commercially available brand product, the present disclosure does not impose a specific limitation thereto.

According to the present disclosure, the weighting agent may be a conventional weighting agent for drilling fluids in the art, the weighting agent is preferably at least one selected from the group consisting of API barite, ultrafine barium sulfate, magnetite powder, ilmenite powder and trimanganese tetroxide, further preferably API barite.

The oil-based drilling fluids provided by the present disclosure have excellent plugging performance and pressure bearing capability, a desirable rheological property and a strong adaptability, can greatly improve borehole wall stability, and facilitate the reservoir protection.

The present disclosure will be described in detail below with reference to Examples. Among the following Preparation Examples, Examples, Comparative Examples and Test Examples, Base oil: 3 #white oil, purchased from Shanghai Yuanye Bio-Technology Co., Ltd.;

Organic clay: brand No. HW Gel-3, purchased from the West China Oil Wei Technology Co., Ltd. in Chengdu, Sichuan Province.

Primary emulsifier: calcium naphthenate, brand No. HIEMUL, commercially available from Jingzhou Jiahua Technology Co., Ltd. in Hubei Province;

Secondary emulsifier: calcium alkylbenzenesulfonate, brand No. HICOAT, commercially available from Jingzhou Jiahua Technology Co., Ltd. in Hubei Province;

Wetting agent: high fatty acid, brand No. HIWET, commercially available from Jingzhou Jiahua Technology Co., Ltd. in Hubei Province;

Filtrate reducer: humic acid, brand No. Trol-101, commercially available from Jingzhou Jiahua Technology Co., Ltd. in Hubei Province;

Weighting agent: ultrafine barium sulfate, an ordinary commercially available product;

Commercially available unidirectional pressure plugging agent: brand No. DF-1, purchased from Lingshou County Jixin Petroleum Additives Co., Ltd. in Hebei Province;

Unless otherwise specified, the other materials were commonly used and commercially available products.

Preparation Example 1

(1-1) Natural flake graphite (300 mesh, with a purity of 99%), ammonium persulfate and concentrated sulfuric acid (with a concentration of 75 wt %, similarly hereinafter) were put into a three-necked flask according to a weight ratio of 1:130:40 and stirred together for 10 seconds to obtain a homogeneous mixture; the mixture was then placed in a beaker and put into a water bath kettle at 20° C. and subjected to continuous stirring for carrying out a first reaction, during which a large amount of gas was observed to continuously escape from the mixture, until the gas overflow was completely invisible, the first reaction was ended, a first product system including a modified graphite was obtained;

(1-2) The first product system including a modified graphite was repeatedly washed with deionized water and filtered until a pH of the filtrate reached 7, the solid phase obtained from the water washing was dried at 100° C. for 2 h, and then placed in ethanol and subjected to a first ultrasonic treatment (with a power of 100 w, a frequency of 90 Hz, a temperature of 20° C. for 30 min), and subjected to a solid-liquid separation after an end of the first ultrasonic treatment, and the separated solid phase was dried at 60° C. for 2 h to obtain a modified graphite;

(2-1) The concentrated sulfuric acid was added into a three-necked flask and cooled to 3° C. by placing in an ice water bath, the modified graphite was then slowly added while stirring the concentrated sulfuric acid, the potassium permanganate was slowly added after stirring the concentrated sulfuric acid for 1 h (the addition was completed in 1 h), the temperature was subsequently adjusted to 5° C. to carry out a second reaction for 3 h to obtain a second product system comprising a graphene pre-product; wherein a weight ratio of modified graphite:concentrated sulfuric acid: potassium permanganate was 1:33:5;

(2-2) The second product system comprising a graphene pre-product was blended with deionized water, the temperature of mixture was raised to 90° C. and kept for 30 min, a solid-liquid separation was subsequently performed, the solid phase obtained from water washing was subjected to an acid washing with an aqueous hydrochloric acid solution having a concentration of 10 wt %, the solid phase obtained after the acid washing was washed with deionized water and filtrated repeatedly to wash off the acid, until a pH of the filtrate reached 7; the solid phase obtained by washing was mixed with water to obtain a mixed solution, which was subjected to a second ultrasonic treatment (with a power of 1,200 w, a frequency of 300 Hz, a temperature of 20° C. for 60 min); after the second ultrasonic treatment was finished, the mixed solution was standing still for 12 h to undergo a complete delamination, such that a lower solid phase and an upper dispersed phase were obtained, wherein the lower solid phase was an intermediate product oxide graphite flake which had not completely reacted or had a large size, the lower solid phase was removed; the upper dispersed phase was subjected to freeze drying treatment for 12 h to obtain a graphene pre-product;

(3) The graphene pre-product was pulverized to powder, and subsequently subjected to an air-flow exfoliation (the exfoliation was performed at 60° C.) to prepare a nanographene (denoted as S1).

Preparation Example 2

(1-1) Natural flake graphite (300 mesh, with a purity of 99%), ammonium persulfate and concentrated sulfuric acid were put into a three-necked flask according to a weight ratio of 1:140:50 and stirred together for 10 seconds to obtain a homogeneous mixture; the mixture was then placed in a beaker and put into a water bath kettle at 20° C. and subjected to continuous stirring for carrying out a first reaction, during which a large amount of gas was observed to continuously escape from the mixture, until the gas overflow was completely invisible, the first reaction was ended, a first product system including a modified graphite was obtained;

(1-2) The first product system including a modified graphite was repeatedly washed with deionized water and filtered until a pH of the filtrate reached 7, the solid phase obtained from the water washing was dried at 100° C. for 2 h, and then placed in ethanol and subjected to a first ultrasonic treatment (with a power of 100 w, a frequency of 90 Hz, a temperature of 20° C. for 30 min), and subjected to a solid-liquid separation after an end of the first ultrasonic treatment, and the separated solid phase was dried at 60° C. for 2 h to obtain a modified graphite;

(2-1) The concentrated sulfuric acid was added into a three-necked flask and cooled to 3° C. by placing in an ice water bath, the modified graphite was then slowly added while stirring the concentrated sulfuric acid, the potassium permanganate was slowly added after stirring the concentrated sulfuric acid for 1 h (the addition was completed in 1 h), the temperature was subsequently adjusted to 5° C. to carry out a second reaction for 3 h to obtain a second product system comprising a graphene pre-product; wherein a weight ratio of modified graphite:concentrated sulfuric acid: potassium permanganate was 1:37:6;

(2-2) The second product system comprising a graphene pre-product was blended with deionized water, the temperature of mixture was raised to 90° C. and kept for 30 min, a solid-liquid separation was subsequently performed, the solid phase obtained from water washing was subjected to an acid washing with an aqueous hydrochloric acid solution having a concentration of 10 wt %, the solid phase obtained after the acid washing was washed with deionized water and filtrated repeatedly to wash off the acid, until a pH of the filtrate reached 7; the solid phase obtained by washing was mixed with water to obtain a mixed solution, which was subjected to a second ultrasonic treatment (with a power of 1,200 w, a frequency of 300 Hz, a temperature of 20° C. for 60 min); after the second ultrasonic treatment was finished, the mixed solution was standing still for 12 h to undergo a complete delamination, such that a lower solid phase and an upper dispersed phase were obtained, wherein the lower solid phase was an intermediate product oxide graphite flake which had not completely reacted or had a large size, the lower solid phase was removed; the upper dispersed phase was subjected to freeze drying treatment for 12 h to obtain a graphene pre-product;

(3) The graphene pre-product was pulverized to powder, and subsequently subjected to an air-flow exfoliation (the exfoliation was performed at 90° C.) to prepare a nanographene (denoted as S2).

Preparation Example 3

(1-1) Natural flake graphite (300 mesh, with a purity of 99%), peroxyacetic acid and periodic acid were put into a three-necked flask according to a weight ratio of 1:110:20 and stirred together for 10 seconds to obtain a homogeneous mixture; the mixture was then placed in a beaker and put into a water bath kettle at 15° C. and subjected to continuous stirring for carrying out a first reaction, during which a large amount of gas was observed to continuously escape from the mixture, until the gas overflow was completely invisible, the first reaction was ended, a first product system including a modified graphite was obtained;

(1-2) The first product system including a modified graphite was repeatedly washed with deionized water and filtered until a pH of the filtrate reached 7, the solid phase obtained from the water washing was dried at 100° C. for 2 h, and then placed in ethanol and subjected to a first ultrasonic treatment (with a power of 100 w, a frequency of 90 Hz, a temperature of 20° C. for 30 min), and subjected to a solid-liquid separation after an end of the first ultrasonic treatment, and the separated solid phase was dried at 60° C. for 2 h to obtain a modified graphite;

(2-1) The perchloric acid was added into a three-necked flask and cooled to 3° C. by placing in an ice water bath, the modified graphite was then slowly added while stirring the perchloric acid, the dichromic acid was slowly added after stirring the perchloric acid for 1 h (the addition was completed in 1 h), the temperature was subsequently adjusted to 5° C. to carry out a second reaction for 3 h to obtain a second product system comprising a graphene pre-product; wherein a weight ratio of modified graphite:perchloric acid:dichromic acid was 1:20:3;

(2-2) The second product system comprising a graphene pre-product was blended with deionized water, the temperature of mixture was raised to 90° C. and kept for 30 min, a solid-liquid separation was subsequently performed, the solid phase obtained from water washing was subjected to an acid washing with an aqueous hydrochloric acid solution having a concentration of 10 wt %, the solid phase obtained after the acid washing was washed with deionized water and filtrated repeatedly to wash off the acid, until a pH of the filtrate reached 7; the solid phase obtained by washing was mixed with water to obtain a mixed solution, which was subjected to a second ultrasonic treatment (with a power of 1,200 w, a frequency of 300 Hz, a temperature of 20° C. for 60 min); after the second ultrasonic treatment was finished, the mixed solution was standing still for 12 h to undergo a complete delamination, such that a lower solid phase and an upper dispersed phase were obtained, wherein the lower solid phase was an intermediate product oxide graphite flake which had not completely reacted or had a large size, the lower solid phase was removed; the upper dispersed phase was subjected to freeze drying treatment for 12 h to obtain a graphene pre-product;

(3) The graphene pre-product was pulverized to powder, and subsequently subjected to an air-flow exfoliation (the exfoliation was performed at 90° C.) to prepare a nanographene (denoted as S3).

Example 1

100 parts by weight of 3 #white oil and 2 parts by weight of an emulsifier (which was composed of 1.5 parts by weight of a primary emulsifier and 0.5 parts by weight of a secondary emulsifier) were taken and mixed at a stirring rate of 1,000 r/min for 10 min, 6 parts by weight of an organic clay was then added and blended at a stirring rate of 2,000 r/min for 10 min, 20 parts by weight of a calcium chloride aqueous solution (with a concentration of 25 wt %) was subsequently added and stirred at a stirring rate of 2,000 r/min for 10 min, 3 parts by weight of a wetting agent was further added and agitated at a stirring rate of 2,000 r/min for 10 min, 3 parts by weight of calcium oxide was then added and mixed at a stirring rate of 2,000 r/min for 20 min, 3 parts by weight of a filtrate reducer was subsequently added and blended at a stirring rate of 2,000 r/min for 20 min, parts by weight of a weighting agent was further added and agitated at a stirring rate of 2,000 r/min for 20 min, 4 parts by weight of a plugging agent-S1 was subsequently added and stirred at a stirring rate of 2,000 r/min for 30 min, an oil-based drilling fluid (denoted as F1) was prepared.

The ingredients of F1 and contents thereof were shown in Table 1.

Examples 2-3

The oil-based drilling fluids were prepared according to the method in Example 1, except that the nanographene-S2 and nanographene-S3 were used as the plugging agent, respectively, the other conditions were the same as those in Example 1. The oil-based drilling fluids (denoted as F2 and F3, respectively) were prepared.

Example 4

100 parts by weight of 3 #white oil and 5 parts by weight of an emulsifier (which was composed of 3 parts by weight of a primary emulsifier and 2 parts by weight of a secondary emulsifier) were taken and mixed at a stirring rate of 1,000 r/min for 10 min, 10 parts by weight of an organic clay was then added and blended at a stirring rate of 2,000 r/min for 10 min, 30 parts by weight of a calcium chloride aqueous solution (with a concentration of 25 wt %) was subsequently added and stirred at a stirring rate of 2,000 r/min for 10 min, 5 parts by weight of a wetting agent was further added and agitated at a stirring rate of 2,000 r/min for 10 min, 6 parts by weight of calcium oxide was then added and mixed at a stirring rate of 2,000 r/min for 20 min, 6 parts by weight of a filtrate reducer was subsequently added and blended at a stirring rate of 2,000 r/min for 20 min, 20 parts by weight of a weighting agent was further added and agitated at a stirring rate of 2,000 r/min for 20 min, 16 parts by weight of a plugging agent-S1 was subsequently added and stirred at a stirring rate of 2,000 r/min for 30 min, an oil-based drilling fluid (denoted as F4) was prepared.

The ingredients of F4 and contents thereof were shown in Table 1.

Examples 5-6

The oil-based drilling fluids were prepared according to the method in Example 4, except that the nanographene-S2 and nanographene-S3 were used as the plugging agent, respectively, the other conditions were the same as those in Example 4. The oil-based drilling fluids (denoted as F5 and F6, respectively) were prepared.

Example 7

100 parts by weight of 3 #white oil and 1 parts by weight of an emulsifier (which was composed of 0.7 parts by weight of a primary emulsifier and 0.3 parts by weight of a secondary emulsifier) were taken and mixed at a stirring rate of 1,000 r/min for 10 min, 5 parts by weight of an organic clay was then added and blended at a stirring rate of 2,000 r/min for 10 min, 10 parts by weight of a calcium chloride aqueous solution (with a concentration of 25 wt %) was subsequently added and stirred at a stirring rate of 2,000 r/min for 10 min, 2 parts by weight of a wetting agent was further added and agitated at a stirring rate of 2,000 r/min for 10 min, 2 parts by weight of calcium oxide was then added and mixed at a stirring rate of 2,000 r/min for 20 min, 2 parts by weight of a filtrate reducer was subsequently added and blended at a stirring rate of 2,000 r/min for 20 min, 5 parts by weight of a weighting agent was further added and agitated at a stirring rate of 2,000 r/min for 20 min, 3 parts by weight of a plugging agent-S1 was subsequently added and stirred at a stirring rate of 2,000 r/min for 30 min, an oil-based drilling fluid (denoted as F7) was prepared.

The ingredients of F7 and contents thereof were shown in Table 1.

Examples 8-9

The oil-based drilling fluids were prepared according to the method in Example 7, except that the nanographene-S2 and nanographene-S3 were used as the plugging agent, respectively, the other conditions were the same as those in Example 7. The oil-based drilling fluids (denoted as F8 and F9, respectively) were prepared.

Example 10

100 parts by weight of 3 #white oil and 6 parts by weight of an emulsifier (which was composed of 4 parts by weight of a primary emulsifier and 2 parts by weight of a secondary emulsifier) were taken and mixed at a stirring rate of 1,000 r/min for 10 min, 12 parts by weight of an organic clay was then added and blended at a stirring rate of 2,000 r/min for 10 min, 40 parts by weight of a calcium chloride aqueous solution (with a concentration of 25 wt %) was subsequently added and stirred at a stirring rate of 2,000 r/min for 10 min, 6 parts by weight of a wetting agent was further added and agitated at a stirring rate of 2,000 r/min for 10 min, 7 parts by weight of calcium oxide was then added and mixed at a stirring rate of 2,000 r/min for 20 min, 10 parts by weight of a filtrate reducer was subsequently added and blended at a stirring rate of 2,000 r/min for 20 min, 30 parts by weight of a weighting agent was further added and agitated at a stirring rate of 2,000 r/min for 20 min, 18 parts by weight of a plugging agent-S1 was subsequently added and stirred at a stirring rate of 2,000 r/min for 30 min, an oil-based drilling fluid (denoted as F10) was prepared.

The ingredients of F10 and contents thereof were shown in Table 1.

Examples 11-12

The oil-based drilling fluids were prepared according to the method in Example 10, except that the nanographene-S2 and nanographene-S3 were used as the plugging agent, respectively, the other conditions were the same as those in Example 10. The oil-based drilling fluids (denoted as F11 and F12, respectively) were prepared.

Comparative Example 1

The oil-based drilling fluid was prepared according to the method in Example 1, except that the plugging agent-S1 was not added, the other conditions were the same as those in Example 1. The oil-based drilling fluid (denoted as DF1) was prepared.

Comparative Example 2

The oil-based drilling fluid was prepared according to the method in Example 1, except that the graphene pre-product prepared in step (2-2) of the Preparation Example 1 was used as the plugging agent, the other conditions were the same as those in Example 1. The oil-based drilling fluid (denoted as DF2) was prepared.

Comparative Example 3

The oil-based drilling fluid was prepared according to the method in Example 2, except that the graphene pre-product prepared in step (2-2) of the Preparation Example 2 was used as the plugging agent, the other conditions were the same as those in Example 2. The oil-based drilling fluid (denoted as DF3) was prepared.

Comparative Example 4

The oil-based drilling fluid was prepared according to the method in Example 3, except that the graphene pre-product prepared in step (2-2) of the Preparation Example 3 was used as the plugging agent, the other conditions were the same as those in Example 3. The oil-based drilling fluid (denoted as DF4) was prepared.

Comparative Example 5

The oil-based drilling fluid was prepared according to the method in Example 1, except that the plugging agent-S1 was replaced by the natural flake graphite, the other conditions were the same as those in Example 1. The oil-based drilling fluid (denoted as DF5) was prepared.

Comparative Example 6

The oil-based drilling fluid was prepared according to the method in Example 1, except that the plugging agent-S1 was replaced by the commercially available unidirectional pressure plugging agent, the other conditions were the same as those in Example 1. The oil-based drilling fluid (denoted as DF6) was prepared.

Comparative Example 7

The oil-based drilling fluid was prepared according to the method in Example 1, except that the added amount of the plugging agent-S1 was adjusted to 20 parts by weight, the other conditions were the same as those in Example 1. The oil-based drilling fluid (denoted as DF7) was prepared.

TABLE 1

| Ingredients parts by weight | Examples 1-12 | | | | | | | | | | | |
|---|---|---|---|---|---|---|---|---|---|---|---|---|
| | F1 | F2 | F3 | F4 | F5 | F6 | F7 | F8 | F9 | F10 | F11 | F12 |
| 3# white oil | 100 | 100 | 100 | 100 | 100 | 100 | 100 | 100 | 100 | 100 | 100 | 100 |
| Emulsifier | 2 | 2 | 2 | 5 | 5 | 5 | 1 | 1 | 1 | 6 | 6 | 6 |
| Organic clay | 6 | 6 | 6 | 10 | 10 | 10 | 5 | 5 | 5 | 12 | 12 | 12 |
| Calcium chloride aqueous solution | 20 | 20 | 20 | 30 | 30 | 30 | 10 | 10 | 10 | 40 | 40 | 40 |
| Wetting agent | 3 | 3 | 3 | 5 | 5 | 5 | 2 | 2 | 2 | 6 | 6 | 6 |
| Calcium oxide | 3 | 3 | 3 | 6 | 6 | 6 | 2 | 2 | 2 | 7 | 7 | 7 |
| Filtrate reducer | 3 | 3 | 3 | 6 | 6 | 6 | 2 | 2 | 2 | 10 | 10 | 10 |
| Weighting agent | 10 | 10 | 10 | 20 | 20 | 20 | 5 | 5 | 5 | 30 | 30 | 30 |
| Plugging agent-S1 | 4 | — | — | 16 | — | — | 3 | — | — | 18 | — | — |
| Plugging agent-S2 | — | 4 | — | — | 16 | — | — | 3 | — | — | 18 | — |
| Plugging agent-S3 | — | — | 4 | — | — | 16 | — | — | 3 | — | — | 18 |

| Ingredients parts by weight | Comparative Examples 1-7 | | | | | | |
|---|---|---|---|---|---|---|---|
| | DF1 | DF2 | DF3 | DF4 | DF5 | DF6 | DF7 |
| 3# white oil | 100 | 100 | 100 | 100 | 100 | 100 | 100 |
| Emulsifier | 2 | 2 | 2 | 2 | 2 | 2 | 2 |
| Organic clay | 6 | 6 | 6 | 6 | 6 | 6 | 6 |
| Calcium chloride aqueous solution | 20 | 20 | 20 | 20 | 20 | 20 | 20 |
| Wetting agent | 3 | 3 | 3 | 3 | 3 | 3 | 3 |
| Calcium oxide | 3 | 3 | 3 | 3 | 3 | 3 | 3 |
| Filtrate reducer | 3 | 3 | 3 | 3 | 3 | 3 | 3 |
| Weighting agent | 10 | 10 | 10 | 10 | 10 | 10 | 10 |
| Plugging agent-S1 | — | — | — | — | — | — | 20 |
| Graphene pre-product | — | 4 | 4 | 4 | — | — | — |

TABLE 1-continued

| | | | | | | | |
|---|---|---|---|---|---|---|---|
| Natural flake graphite | — | — | — | — | 4 | — | — |
| Commercially available unidirectional pressure plugging agent | — | — | — | — | — | 4 | — |

Note: the graphene pre-products in Table 1 (Continued) used for preparing the oil-based drilling fluids DF2-DF4 were the graphene pre-products prepared in step (2-2) of Preparation Examples 1-3, respectively.

Test Examples

The nanographene products S1-S3 prepared in the Preparation Examples 1-3 were respectively subjected to a particle size test and a contact angle test for evaluating their lipophilicity and dispersibility; in addition, the oil-based drilling fluids F1-F12 prepared in Examples 1-12 and the oil-based drilling fluids DF1-DF7 prepared in Comparative Examples 1-7 were subjected to the tests of plugging performance and pressure bearing capability, and the nanographene products were subjected to the test of compatibility property in the oil-based drilling fluids. In the following Test Examples, The apparent viscosity (AV, mPa·s), plastic viscosity (PV, mPa·s), yield point (YP, Pa) were measured by using a six-speed rotational viscometer and according to the method specified in the Chinese National Standard GB/T29170-2012;

The medium pressure filtrate loss amount (API, mL) was measured by using a medium pressure filtrate loss meter and according to the method specified in the Chinese National Standard GB/T29170-2012;

The high-temperature and high-pressure filtrate loss amount (HTHP, mL) was measured by using a high-temperature and high-pressure filtrate loss meter and according to the method specified in the Chinese National Standard GB/T29170-2012;

The manufacturer of the Laser Particle Size Analyzer (LPSA) was the Malvern Instruments Limited in the United Kingdom;

The manufacturer of contact angle meter with a model number SDC-350 was the Chengdu Snow Leopard Technology Co., Ltd.;

The manufacturer of a six-speed rotational viscometer with a model number ZNN-D65 was the Stimlab Co., Ltd.;

The medium pressure filtrate loss meter with a model number SD4/SD4A was manufactured by the Stimlab Co., Ltd.;

The high-temperature and high-pressure filtrate loss meter with a model number KC-GS173 was manufactured by the KENCE Instrument(Shang Hai) Co., Ltd.

1. Particle Size and Contact Angle

Particle size test: the plugging agents S1-S3 were added into the white oil and subjected to sufficient stirring, the particle size of the plugging agents after being dispersed in the white oil was measured by using a Laser Particle Size Analyzer, and the degree of dispersion was observed.

Contact Angle test: 300 mg of the plugging agents S1-S3 were respectively weighted and fabricated into the sample flakes by using a tablet press, the contact angles of white oil and distilled water on the flake surface were respectively measured by using a contact angle meter.

The measurement results were shown in Table 2.

TABLE 2

| Test objects | Average particle size/nm | Contact with white oil | Contact angle with distilled water/° | Dispersion degree in white oil |
|---|---|---|---|---|
| S1 | 212 | Completely spread | 89.2 | No agglomeration |
| S2 | 400 | Completely spread | 93.6 | No agglomeration |
| S3 | 600 | Completely spread | 91.2 | No agglomeration |

As illustrated by Table 2, the average particle size of the plugging agents S1-S3 was within a range of 200-600 nm, the contact angle with distilled water was between 89.2°-91.2°, the agglomeration phenomenon did not occur in the white oil phase, which demonstrated that the nanographene prepared in the present disclosure had excellent dispersibility in the oil phase, it did not agglomerate, so that it was dispersable in the oil phase in nano-scale size, thereby satisfying the use requirement for plugging the micro-fractures of the mud shale stratum.

2. Plugging Performance

A base slurry (consisting of white oil+1 wt % of a primary emulsifier+3 wt % of a secondary emulsifier+4 wt % of a wetting agent+8 wt % of an organic clay+62.5 wt % of a barite+6 wt % of a filtrate reducer, wherein the percentage contents of the ingredients were based on the weight of white oil) was placed in a mud cup of the high-temperature and high-pressure filtrate loss meter, a test of high-temperature and high-pressure filtrate loss amount was performed under the conditions consisting of a temperature of 105° C. and a pressure differential of 3.5 MPa for 60 min, after completion of the test, the base slurry was cooled to room temperature, the base slurry in the mud cup was poured out, a filter cake was left at the bottom of the mud cup; white oil was injected along the inner wall of the mud cup for 1-2 times and the mud cup was gently shaken during the injection process, after which the white oil was poured to wash off the floating mud on the filter cake; the white oil was injected into the mud cup to a scale mark, the test of high-temperature and high-pressure filtrate loss amount was repeated under the conditions consisting of a temperature of 105° C. and a pressure differential of 3.5 MPa for a test time of 30 min, so as to further wash off the floating mud, after completion of the test, the white oil was cooled to room temperature, the white oil was poured out, the mud cake in the mud cup was removed, the mud cake permeability 684×10-2 mD of the base slurry was calculated based on the Formula (I); the mud cake of base slurry was used as a simulated stratum having micro-nanometer cracks;

$$K_0 = q \cdot l \cdot \mu / (A \cdot \Delta p) \qquad \text{Formula (I)}$$

Wherein $K_0$: permeability, mD;
q: average filtrate loss per unit time, cm$^3$/s;
l: thickness of mud cake, mm;

μ: viscosity of drilling fluid, mPa·s;
A: area of mud cake, m$^2$;
Δp: pressure differential, MPa The drilling fluids F1-F12, DF1-DF7 as the test slurries were subjected to aging treatment (with an aging temperature of 105° C. and an aging time of 16 h), the drilling fluids were cooled to room temperature and then respectively placed in a mud cup of a high-temperature and high-pressure filtrate loss meter (the aforementioned mud cake of base slurry was used as the percolation medium at the bottom of the mud cup), the test of high-temperature and high-pressure filtrate loss amount was performed under the conditions consisting of a temperature of 105° C. and a pressure differential of 3.5 MPa for 30 min. After completion of test, the test slurry was cooled to room temperature, the test slurry in the mud cup was poured out, the mud cake of the test slurry at the bottom of the mud cup was retained; white oil was injected along the inner wall of the mud cup for 1-2 times and the mud cup was gently shaken during the injection process, the white oil was then poured to wash off the floating mud on the filter cake; the white oil was injected into the mud cup to a scale mark, the test of high-temperature and high-pressure filtrate loss amount was repeated under the conditions consisting of a temperature of 105° C. and a pressure differential of 3.5 MPa for a test time of 30 min, so as to further wash off the floating mud, after completion of the test, the white oil was cooled to room temperature, the white oil was poured out, the mud cake of the test slurry in the mud cup was removed, the mud cake permeability (denoted as $K_1$, mD) of the test slurries F1-F12 and DF1-DF7 was respectively calculated based on the Formula (I); on this basis, the permeability reduction percentages before and after plugging of the simulated stratum by using the test slurries F1-F12 and DF1-DF7 were calculated according to the Formula (II) (i.e., the plugging effect was characterized by the permeability reduction percentage, the higher was the permeability reduction percentage, indicating that the better was the plugging effect of the plugging material), the results were shown in Table 3;

$$K_r = \frac{K_0 - K_1}{K_0} \times 100\% \qquad \text{Formula (II)}$$

Wherein $K_r$: permeability reduction percentage, %;
$K_0$: permeability of the base slurry mud cake (simulated stratum), mD;
$K_1$: permeability of test slurry mud cake, mD

TABLE 3

| Oil-based drilling fluids | Permeability ($10^{-2}$mD) | Permeability reduction percentage (%) |
|---|---|---|
| F1 | 3.42 | 99.50 |
| F2 | 2.89 | 99.58 |
| F3 | 7.93 | 98.83 |
| F4 | 2.79 | 99.59 |
| F5 | 11.24 | 98.35 |
| F6 | 12.13 | 98.22 |
| F7 | 8.43 | 98.76 |
| F8 | 14.56 | 98.87 |
| F9 | 8.99 | 98.68 |
| F10 | 14.7 | 97.84 |
| F11 | 13.14 | 98.07 |
| F12 | 16.22 | 97.62 |
| DF1 | 434.33 | 36.13 |
| DF2 | 278.88 | 58.99 |
| DF3 | 312.23 | 54.08 |
| DF4 | 298.86 | 56.05 |
| DF5 | 348.65 | 47.73 |
| DF6 | 198.86 | 70.76 |
| DF7 | 87.34 | 87.22 |

As illustrated by the simulation test results of Table 3, the oil-based drilling fluids F1-F12 used the nanographene provided by the present disclosure as a plugging agent, can effectively plug micro-nanometer cracks in a simulated stratum, showing excellent plugging performance with permeability reduction percentage more than 97%. In contrast, the oil-based drilling fluid DF1 did not use a plugging agent, the plugging agents used by the oil-based drilling fluids DF2-DF4 were not prepared according to the method of the present disclosure, the oil-based drilling fluids DF5-DF6 used conventional and commercially available plugging agent or natural flake graphite as the plugging agents, their plugging effects were significantly inferior to the plugging effects of the oil-based drilling fluids F1-F12. The excellent plugging performance obtained by the oil-based drilling fluids F1-F12 was benefited from that the nanographene plugging agent used therein had desirable lipophilicity, can be uniformly dispersed in the oil-based drilling fluid system, and had a suitable size and desired pressure bearing performance, thereby effectively plugging micro-nanometer cracks, reducing the permeability of stratum and preventing the drilling fluid from invading the stratum. In particular, the oil-based drilling fluid DF7 did not use the oil-based drilling fluid formulation of the present disclosure, thus its plugging performance had a certain distance from the plugging performance of the oil-based drilling fluids F1-F12.

3. Pressure Bearing Performance

The long crack mold (with a crack width of 4.0 mm and a crack length of 1.0 m) was loaded into a DL-B type plugging simulation testing device, the drilling fluids F1-F12 and DF1-DF7 were added into the device respectively, and pressurized in a gradient of 0.5 MPa from 0 MPa, and stabilized each pressure for 3 min until pressurized to 6 MPa and stabilized the pressure for 3 min, the amount of liquid (i.e. the amount of filtrate) driven out at different pressures during the process were shown in Table 4.

TABLE 4

| Filtrate amount/mL | Pressure/MPa | | | | | |
|---|---|---|---|---|---|---|
| | 1 | 2 | 3 | 4 | 5 | 6 |
| F1 | 0 | 1.3 | 2.2 | 2.6 | 0 | 0 |
| F2 | 0 | 0 | 2.1 | 3.3 | 0 | 0 |
| F3 | 0 | 1 | 2 | 4.2 | 0 | 0 |
| F4 | 0 | 1.2 | 2 | 1.6 | 0 | 0 |
| F5 | 0 | 0.5 | 1.5 | 0 | 2.2 | 0 |
| F6 | 1.2 | 1 | 2 | 0 | 1.8 | 0 |
| F7 | 0 | 1 | 3.2 | 5 | 3.2 | 0 |
| F8 | 0 | 0.6 | 2 | 0 | 1.4 | 0 |
| F9 | 0 | 1 | 2.5 | 4.6 | 4.5 | 0 |
| F10 | 0 | 1.4 | 2 | 3.5 | 0.6 | 0 |
| F11 | 0 | 1 | 1.6 | 3.3 | 0 | 0 |
| F12 | 0 | 1.4 | 2 | 2.8 | 0 | 0 |
| DF1 | 30 | 80 | 20 | 0 | 10 | 20 |
| DF2 | 20 | 20 | 12 | 0 | 0 | 0 |
| DF3 | 16 | 21 | 12 | 6 | 0 | 5 |
| DF4 | 23 | 22 | 12 | 5 | 0 | 0 |

TABLE 4-continued

| Filtrate amount/mL | Pressure/MPa | | | | | |
|---|---|---|---|---|---|---|
| | 1 | 2 | 3 | 4 | 5 | 6 |
| DF5 | 21 | 10 | 16 | 9 | 3 | 0 |
| DF6 | 8 | 12 | 16 | 0 | 5 | 8 |
| DF7 | 12 | 19 | 6 | 12 | 0 | 4 |

As can be seen from Table 4, the oil-based drilling fluids F1-F12 can withstand a pressure of 6.0 MPa in the plugging simulation testing, and exhibited excellent pressure bearing performance, which was conducive to delaying pressure transmission of pores and cracks and improving pressure bearing capacity of the stratum. In contrast, the oil-based drilling fluids DF1-DF7 had an inferior pressure bearing performance.

4. Compatibility

An based slurry-A (consisting of white oil+6 wt % organic clay+4 wt % emulsifier+3 wt % wetting agent+25 wt % barite+6 wt % filtrate reducer+20 wt % calcium chloride aqueous solution+5 wt % calcium oxide, wherein the percentage contents of the ingredients were based on the weight of white oil) was prepared, the based slurry-A was subsequently added with 10 wt % of nanographene-S1 (based on the weight of the white oil in the based slurry-A) prepared in Preparation Example 1, such that an oil-based drilling fluid-B was prepared.

The rheological parameters of the based slurry-A and the oil-based drilling fluid-B were tested separately under a normal temperatures, the test results were shown in Table 5.

TABLE 5

| Drilling fluids | AV mPa · s | PV mPa · s | YP Pa | YP/PV Pa/(mPa · s) |
|---|---|---|---|---|
| A | 77 | 46 | 7.5 | 0.242 |
| B | 78 | 45 | 6.0 | 0.182 |

As can be seen in Table 5, the addition of nanographene plugging agent of the present disclosure had small influence on the rheological property of oil-based drilling fluids, the rheological property was still desirable, it demonstrated that the nanographene provided by the present disclosure had a desired compatibility when used as a plugging agent for oil-based drilling fluids.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method of preparing a nanographene comprising the following steps:
   (1) carrying out a first reaction by contacting a raw material graphite and a first oxidizing agent with an intercalating agent to obtain a modified graphite;
   (2) performing a second reaction by contacting the modified graphite and an acid with a second oxidizing agent to obtain a graphene pre-product;
   (3) subjecting the graphene pre-product to an air-flow exfoliation to prepare the nanographene;
   wherein a weight ratio of the raw material graphite: the first oxidizing agent: the intercalating agent in step (1) is 1: 110-150:20-60;
   wherein a weight ratio of the modified graphite: the acid: the second oxidizing agent in step (2) is 1: 20-40:3-8;
   wherein a condition of the first reaction in step (1) comprises a temperature of 10-25° C.;
   wherein a condition of the second reaction in step (2) comprises a temperature of 1-10° C. and a time of 2-4 hours; and
   wherein a condition of the air-flow exfoliation in step (3) comprises a temperature of 30-90° C.

2. The method of claim 1, wherein the weight ratio of the raw material graphite: the first oxidizing agent: the intercalating agent in step (1) 1:120-140:30-50.

3. The method of claim 1, wherein the weight ratio of the modified graphite:the acid:the second oxidizing agent in step (2) is 1:30-37:4-6.

4. The method of claim 1, wherein the first oxidizing agent is selected from the group consisting of ammonium persulfate, potassium persulfate, sodium percarbonate, peroxyacetic acid, and a combination thereof;
   and/or, wherein the intercalating agent is selected from the group consisting of concentrated sulfuric acid, potassium permanganate, periodic acid, and a combination thereof;
   and/or, wherein the second oxidizing agent is selected from the group consisting of potassium permanganate, ferric acid, persulfate, dichromic acid, and a combination thereof;
   and/or, wherein the acid is selected from the group consisting of concentrated sulphuric acid, perchloric acid, periodic acid, concentrated nitric acid, and a combination thereof.

5. The method of claim 4, wherein the first oxidizing agent is ammonium persulfate;
   and/or, the intercalating agent is concentrated sulfuric acid;
   and/or, the second oxidizing agent is potassium permanganate;
   and/or, the acid is concentrated sulphuric acid.

6. A nanographene produced with the method of claim 1, wherein the nanographene has an average particle size of 110-750 nm.

7. The nanographene of claim 6, wherein the nanographene has an average particle size of 110-600 nm.

8. An oil-based drilling fluid comprising the nanographene of claim 6.

9. The oil-based drilling fluid of claim 8, wherein the oil-based drilling fluid comprises the following ingredients: 100 parts by weight of a base oil, 5-12 parts by weight of an organic clay, 1-6 parts by weight of an emulsifier, 2-6 parts by weight of a wetting agent, 3-18 parts by weight of the nanographene, 5-30 parts by weight of a weighting agent, 2-10 parts by weight of a filtrate reducer, 10-40 parts by weight of a calcium chloride aqueous solution and 2-7 parts by weight of calcium oxide.

10. The oil-based drilling fluid of claim 9, wherein the oil-based drilling fluid comprises the following ingredients: 100 parts by weight of a base oil, 6-10 parts by weight of an organic clay, 2-5 parts by weight of an emulsifier, 3-5 parts by weight of a wetting agent, 4-16 parts by weight of the nanographene, 10-20 parts by weight of a weighting agent, 3-6 parts by weight of a filtrate reducer, 20-30 parts by weight of a calcium chloride aqueous solution and 3-6 parts by weight of calcium oxide.

11. The oil-based drilling fluid of claim 9, wherein the base oil is selected from white oil and/or diesel oil;
   and/or, the organic clay is an oleophilic clay produced from an interaction of a hydrophilic bentonite with an alkyl quaternary ammonium salt cationic surfactant, and/or, the emulsifier comprises a primary emulsifier and a secondary emulsifier;
   wherein the primary emulsifier is selected from the group consisting of calcium naphthenate, oleic acid, a naphthenic acid amide, and a combination thereof, and the secondary emulsifier is a Span series emulsifier and/or calcium alkylbenzenesulfonate;
   and/or, the wetting agent is a fatty acid derivative;
   and/or, the filtrate reducer is selected from the group consisting of sodium carboxymethyl cellulose, humic acid, lignite lye, and a combination thereof;
   and/or, the weighting agent is selected from the group consisting of API barite, ultrafine barium sulfate, magnetite powder, ilmenite powder, trimanganese tetroxide and a combination thereof.

12. The oil-based drilling fluid of claim 11, wherein the base oil is white oil;
   and/or, the filtrate reducer is sodium carboxymethyl cellulose;
   and/or, the weighting agent is API barite.

\* \* \* \* \*